United States Patent [19]
Simons

[11] 3,782,526
[45] Jan. 1, 1974

[54] CONTAINER ORIENTER

[75] Inventor: Henry M. Simons, Wilmington, Calif.

[73] Assignee: The Quaker Oats Company, Chicago, Ill.

[22] Filed: July 21, 1971

[21] Appl. No.: 164,602

[52] U.S. Cl..... 198/31 AA, 198/33 AC, 198/33 AA
[51] Int. Cl............................................. B65g 47/26
[58] Field of Search............ 193/43 R, 43 A, 43 D; 221/158, 217, 218, 220, 156; 198/31 AA, 33 AA, 33 AC

[56] References Cited
UNITED STATES PATENTS

| | | | |
|---|---|---|---|
| 3,451,524 | 6/1969 | Normandin | 193/43 R |
| 2,529,603 | 11/1950 | Galt | 193/43 A |
| 369,260 | 8/1887 | Richards | 221/217 X |
| 2,511,266 | 6/1950 | Hube et al. | 193/43 A |
| 3,195,705 | 7/1965 | Ochs et al. | 193/43 R |
| 3,096,575 | 7/1963 | Cook | 221/156 X |

Primary Examiner—Evon C. Blunk
Assistant Examiner—Douglas D. Watts
Attorney—Donnie Rudd et al.

[57] ABSTRACT

A container orienter is disclosed. The orienter is for use with round containers having upper and lower chimes of different radii and is for orienting the containers with the upper chimes in the upright position. The container orienter has an inclined rotatable indented wheel with downwardly extending fingers in the indentations. As containers move along a conveyor system adjacent to the rotatable wheel, the fingers engage the containers having the larger chime in the upper position and separate them from the other containers in order that all of the containers may be oriented in the same position.

1 Claim, 4 Drawing Figures

INVENTOR
HENRY M. SIMONS

CONTAINER ORIENTER

BACKGROUND OF THE INVENTION

1. Field of the Invention

This invention relates to a container orienter for orienting containers in an upright position. The container orienter is for use with round containers having an upper chime and a lower chime having different radii such that one chime may engage the other when the containers are stacked one on another.

2. Description of the Prior Art

The canning industry has had a problem for years in providing a system for stacking one can upon another while still providing some stability to the stacked cans to keep them from sliding one upon another and falling down. This problem in recent years has been overcome by the so-called stackable can. This can is essentially a round can with its upper seam or rime or chime as it may be called having a radius greater than the radius of the lower chime. In stacking the inside boundry of the upper chime receives the outside boundry of the lower chime of the container placed above it. This interlocking feature prevents the containers from slipping one on another. With this interlocking feature it has become necessary for all of the containers to have their labels applied with the larger chime in either the upper direction or the lower direction as long as all of the containers have the labels applied with the chimes in the same orientation. One way to accomplish this orientation is by a manual inspection and division. Another way is by the use of complex orienting equipment. This invention makes use of a simple and inexpensive apparatus for use in orienting the containers.

SUMMARY OF THE INVENTION

It is an object of this invention to provide a container orienter for orienting containers in an upright position with said container orienter being used with round containers having an upper chime and a lower chime having different radii such that one chime may engage the other when the containers are stacked one on another.

The object of this invention is accomplished by a container orienter for orienting containers in an upright position, said container orienter for use with round containers having an upper chime and a lower chime having different radii such that one chime may engage the other when the containers are stacked one on another, said container orienter comprising: means for conveying containers; an inclined rotatable indented wheel extending partially over the means for conveying containers; means for engaging a container chime of one radius and not engaging a container chime having a smaller radius, said means for engaging a container chime of one radius and not engaging a container chime of a smaller radius being attached to said inclined rotatable indented wheel; means for receiving and conveying away from the inclined rotatable indented wheel the containers whose chimes were engaged by the inclined rotatable indented wheel; and means for inverting those containers not in the upright position.

The object of this invention is further accomplished by a container orienter for orienting containers in an upright position, said container orienter for use with round containers having an upper chime and a lower chime having different radii such that one chime may engage the other when the containers are stacked one on another, said container orienter comprising: means for conveying containers; a rotatable indented wheel, said rotatable indented wheel having a plurality of circular indentations about the perimeter thereof, said rotatable indented wheel being inclined with relation to said means for conveying containers and said rotatable indented wheel having its lowest point of incline immediately above the means for conveying containers, said circular indentations each having a downward curved indexing finger extending from substantially the center of the curved indentation with the distance between the edge of the circular indentation and the downward curve of the indexing finger being greater than the width of the larger radius chime and less than the distance from the outer container edge to the outer edge of the lower radius chime; means for conveying engaged containers away from said rotatable indented wheel; and means for inverting containers not oriented in an upright position, whereby containers move along the means for conveying containers past the rotatable indented whel and the indexing fingers on the wheel engage those containers having the larger radius chime oriented upward and separate them from the other containers in order that those containers not in the upright position may be so oriented.

BRIEF DESCRIPTION OF THE DRAWING

My invention may be more fully described and explained by the attached drawings in which.

Figure 1:
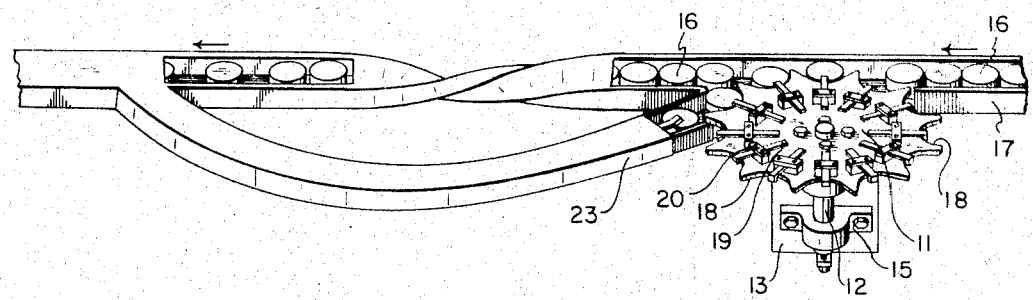
FIG. 1 is a perspective view of the container orienter of my invention.
Figure 2:
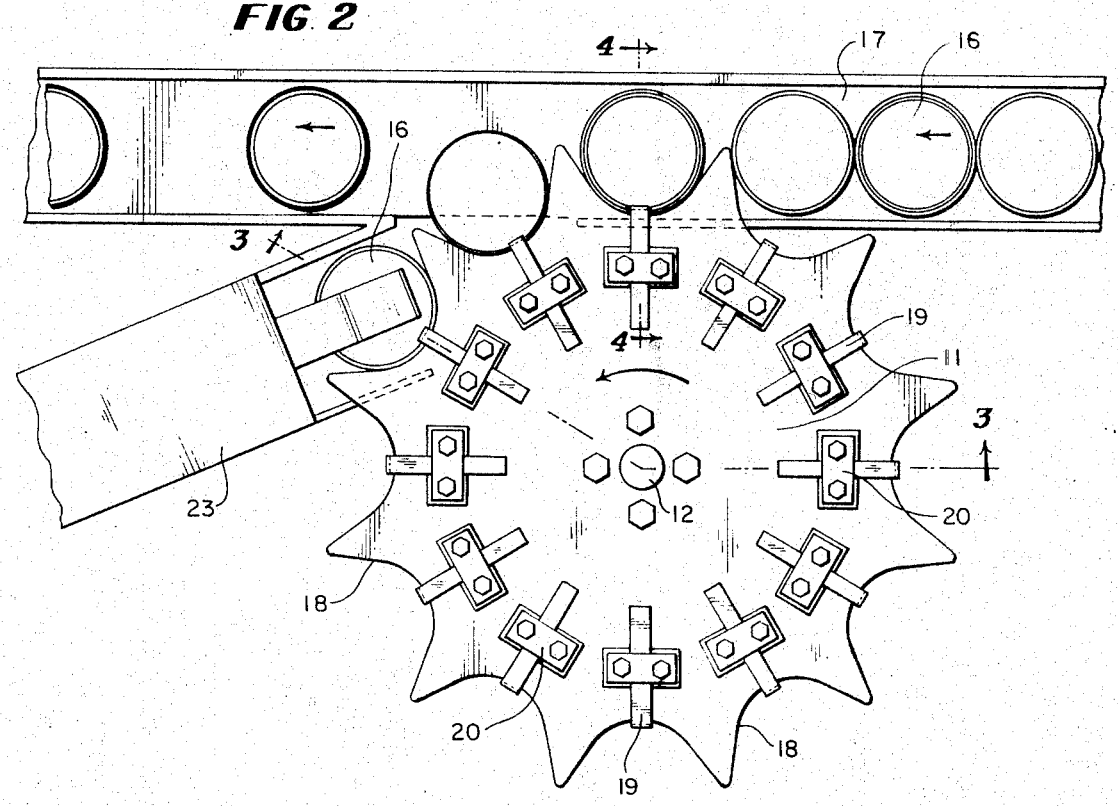
FIG. 2 is a top view thereof.
Figure 3:
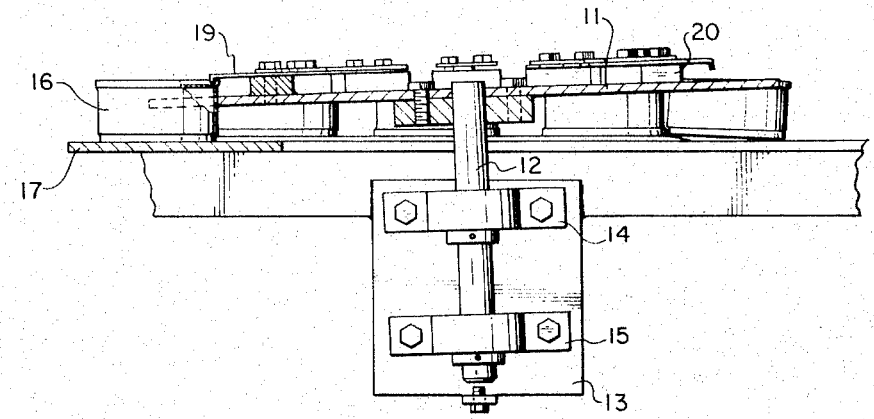
FIG. 3 is a sectional view taken along the line 3—3 of FIG. 2.
Figure 4:
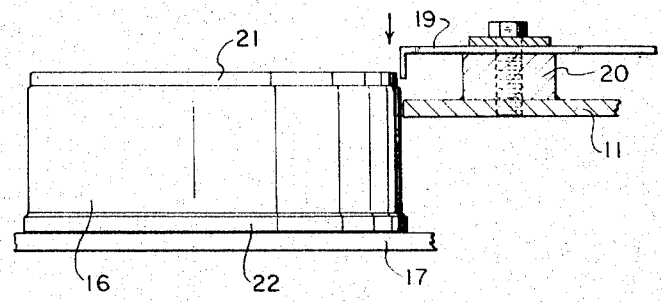
FIG. 4 is a sectional view taken along the line 4—4 of FIG. 2.

In the drawings I have used the numeral 11 to refer to an inclined rotatable indented wheel. The wheel 11 is supported and made rotatable by shaft 12 which is movably attached to base 13 through bearings 14 and 15. Containers 16 move along conveyor 17. It will be noted that the wheel 11 is inclined with respect to the conveyor 17. The wheel 11 has a number of circular indentations 18 along its outer perimeter. In each of the indentations 18 is placed a downward curved indexing finger 19 supported rigidly to wheel 11 by the clamps 20. The indexing finger 19 extends into the center of the indentation a distance sufficient to engage a container having the larger radius chime in the upright position but not sufficiently far to engage a container having the lower radius chime in the upright position. As is illustrated in FIG. 4 a container with the smaller radius chime 21 in the upright position is not engaged by the finger 19. It would be apparent that if the larger radius chime 22 were in the upright position then the finger would engage it. If the larger radius chime is in the upright position then finger 19 on the wheel 11 would engage the container and pull it off of conveyor 17 and onto conveyor 23. As the containers pass onto the conveyor 23, the incline of the wheel 11 lifts the fingers 19 away from the chime allowing the container to proceed down conveyor 23. If the smaller radius chime 21 is in the upright position, then the fingers 19 do not engage the container and the container moves on down conveyor 17.

If it is desired to have the containers having the larger radius chime be oriented in the upright position, then conveyor 23 conveys the container to labeling while conveyor 17 goes through an inversion of the containers so that they may be joined with the other containers in going to labeling. If it is desired to have the containers having the lower radius chime in the upright position, then conveyor 17 goes to labeling while conveyor 23 goes through an inversion before joining the containers with the containers on conveyor 17. In operation, the containers move along conveyor 17 and press on wheel 11 thereby turning it. If the larger radius chime 22 is in the upright position, the inclination of the wheel allows fingers 19 to engage the chime and separate the containers and place them on conveyor 23. If the containers have the lower radius chime 21 in the upright position, then the finger 19 cannot engage the container and the container passes on along conveyor 17. The containers are then oriented depending upon whether it is the desire to have the larger chime in the upright or downward position.

DESCRIPTION OF THE PREFERRED EMBODIMENT

The preferred embodiment is the one disclosed in the drawings and substantially described herein.

Having fully described this new and unique invention, I claim:

1. A container orienter for orienting containers in an upright position, said container orienter for use with round containers having an upper chime and a lower chime having different radii such that one chime may engage the other when the containers are stacked one on another, said container orienter comprising: a movable conveyor for conveying containers; a rotatable wheel, inclined with respect to the movable conveyor, and extending partially over the movable conveyor, said rotatable indented wheel having its lowest point of incline immediately above the movable conveyor, and said rotatable wheel having a plurality of circular indentations about the perimeter thereof with each of the circular indentations having a downward curved indexing finger extending from substantially the center of the curved indentation with the distance between the edge of the circular indentation and the downward curve of the indexing finger being greater than the width of the larger radius chime and less than the distance from the outer container edge to the outer edge of the lower radius chime, and the closest distance between the indexing fingers and the movable conveyor being at a point immediately over the movable conveyor and being less than the total height of the container; means for conveying engaged containers away from the inclined rotatable indented wheel; and means for inverting containers not oriented in an upright position; whereby containers move along the means for conveying containers past the rotatable indented wheel and the indexing fingers on the wheel engage those containers having the larger radius chime oriented upward and separate them from the other containers in order that those containers not in the upright position may be so oriented.

* * * * *